United States Patent [19]

Stone

[11] 4,102,776

[45] Jul. 25, 1978

[54] MOVING BED CONTACTING PROCESS

[75] Inventor: Richard D. Stone, Deerfield, Ill.

[73] Assignee: UOP Inc., Des Plaines, Ill.

[21] Appl. No.: 783,923

[22] Filed: Apr. 1, 1977

Related U.S. Application Data

[62] Division of Ser. No. 625,418, Oct. 24, 1975, Pat. No. 4,040,794.

[51] Int. Cl.² .................................................... C10G 35/10
[52] U.S. Cl. ........................................ 208/64; 208/65; 208/134; 208/138; 208/139; 260/683.3
[58] Field of Search ................ 208/134, 138, 139, 64; 260/683.3

[56] References Cited

U.S. PATENT DOCUMENTS

| | | | |
|---|---|---|---|
| 2,945,807 | 7/1960 | Farnham | 208/134 |
| 3,725,248 | 4/1973 | Greenwood et al. | 208/139 |
| 3,761,390 | 9/1973 | Greenwood et al. | 208/139 |
| 3,799,866 | 3/1974 | Lengemann | 208/139 |

*Primary Examiner*—C. Davis
*Attorney, Agent, or Firm*—James R. Hoatson, Jr.; Richard D. Stone; William H. Page, II

[57] ABSTRACT

An improved moving bed contacting design is disclosed, which is especially useful for moving bed reforming. A moving catalyst bed is contained in a single, downflowing annular bed. Multiple feed inlet and outlet locations, and baffles on screens containing the catalyst, permit radial flow operation through a single bed of catalyst to simulate several distinct catalyst beds. Some gas may flow up or down, instead of radially to increase or decrease the loading of the catalyst bed.

17 Claims, 1 Drawing Figure

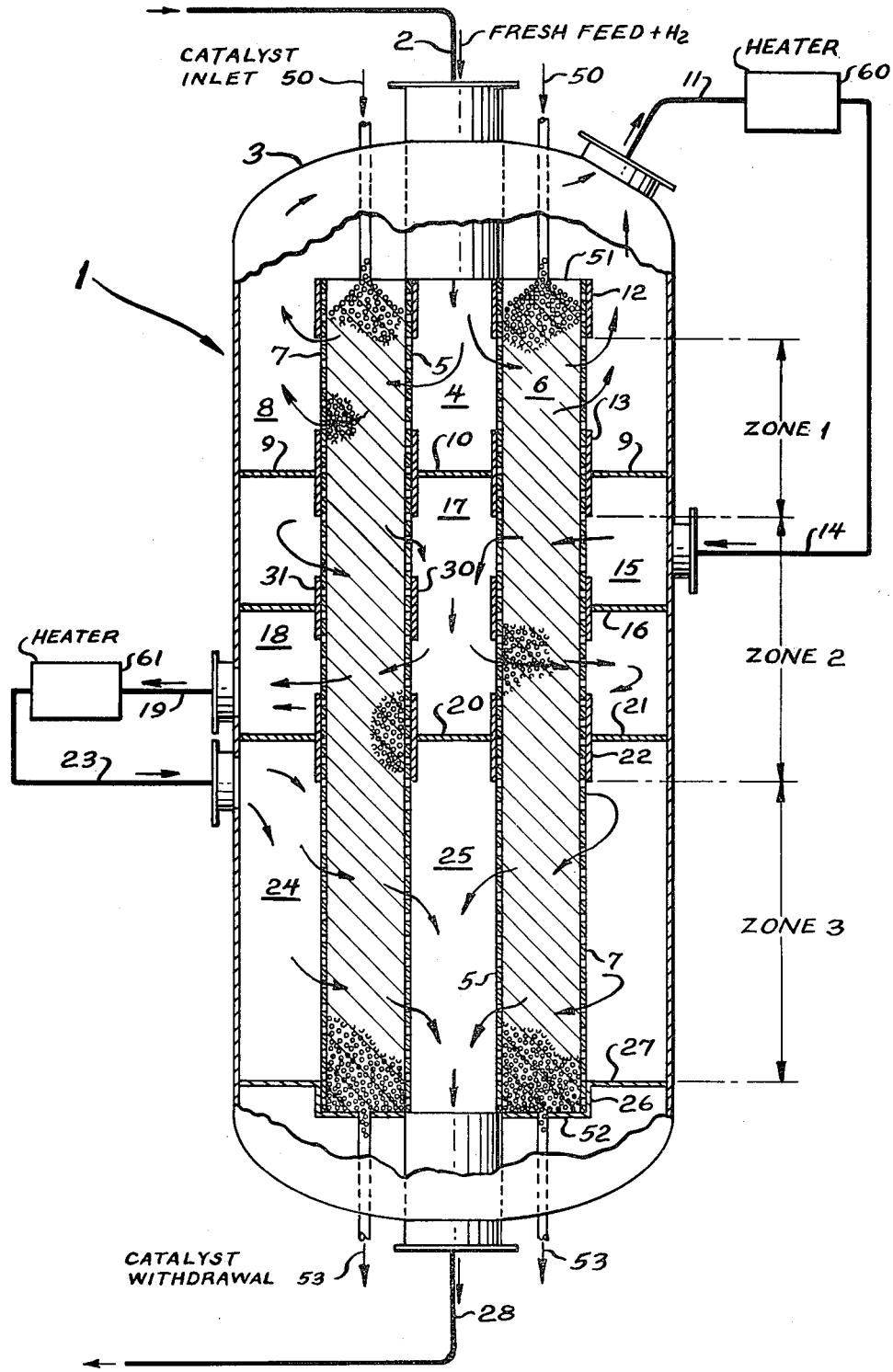

MOVING BED CONTACTING PROCESS

CROSS REFERENCE TO RELATED APPLICATIONS

This application is a division of my copending application Ser. No. 625,418 filed Oct. 24, 1975, now U.S. Pat. 4,040,794, the teachings of which are incorporated by reference.

BACKGROUND OF THE INVENTION

The invention relates to an improved moving bed contacting process and apparatus. In one embodiment, a hydrocarbon conversion process and reactor especially useful for moving bed reforming of naphthas are disclosed.

Description of the Prior Art

Multiple stage reaction systems for affecting the fixed-bed contacting of solids and fluids, in general, and for the fixed bed catalytic conversion of hydrocarbon streams, are well known in the art. In general, the conversion of a reactant stream over a fixed bed of catalyst may be conducted in upward, downward, or radial flow. To achieve the most advantageous contact between the hydrocarbon reactant stream and catalyst particles, the catalyst is preferably disposed in an annular-form section through which the reactant stream flows laterally and radially. Simple radial flow of reactants through a catalyst bed is shown in U.S. Pat. No. 2,683,654 (Class 23-388), the teachings of which are incorporated by reference.

Many types of hydrocarbon conversion systems using multiple stage reactors are known. In petroleum refining technology such systems have been used for catalytic reforming, fixed bed alkylation, hydrorefining, hydrocracking, dehydrogenation, steam reforming, hydrogenation, etc. The present invention will be described with particular reference to catalytic reforming of naphtha, however, the inventive concept affords a distinct improvement in other hydrocarbon conversion processes as well.

Historically, catalytic reforming processes used a number of non-regenerative, fixed-bed reactors, usually located side-by-side. When inevitable catalyst deactivation occured, one or all of the reactors would be shutdown for catalyst regeneration, in situ. One modification of this process was the so-called "swing-bed" system, in which four or five reactors were provided. One reactor at a time would be regenerated with the other reactors remained on stream. This provided a closer approximation of continuous operation, however, the valving required to divert very large $H_2$-hydrocarbon streams around a reactor, and the need to get air into a reactor for regeneration of catalyst therein, without forming an explosive mixture, were serious drawbacks. Another inherent difficulty in the swing-bed system was that every time a reactor was placed in service there was a "startup", which inevitably introduced minor upsets in operation.

Moving bed reaction systems are shown in U.S. Pat. No. 3,470,090 (Class 208-138) and U.S. Pat. No. 3,647,680 (Class 208-65), the teachings of which patents are incorporated by reference. The 3,470,090 patent shows use of a side-by-side reaction system with intermediate heating of the reactant stream. Catalyst is withdrawn from a reaction zone and sent to regeneration facilities, then returned. In the 3,642,680 patent, a stacked catalytic reforming configuration is shown. Multiple reaction zones are provided within a single large reaction vessel by providing narrow connecting pipes between the catalyst beds. These pipes are large enough to permit catalyst to flow by gravity, from one bed to another, but are not large enough to permit any significant amount of gas to flow from one reaction zone to another. Reactants are removed from one reaction zone, sent to an interheater, and charged to the next reaction zone.

The stacked reactor design of U.S. Pat. No. 3,647,680, was a significant advance in the art of reforming of naphtha, and the process described therein has enjoyed world wide commercial success. With the advent of moving bed reforming, petroleum refiners have attempted to increase the severity of their reforming operations. Thus, to increase yields, refiners have gone to lower pressure operation. Low pressure increases yields, but the lowered hydrogen pressure promotes formation of coke and carbonaceous materials on the catalyst. Similarly, there has been a trend to decrease the hydrogen to hydrocarbon mole ratio of feed to a reformer to save on recycle gas compressor cost. There does not seem to be much effect on reformate yield by merely reducing recycle gas flow rate, but reducing this flow rate does reduce the amount of energy expended in recycling gas in the plant. Unfortunately, reduced hydrogen recycle also promotes coke formation. Another trend has been for refiners to opt for higher throughputs, or higher liquid hourly spaced velocities. This requires higher temperature operation and more frequent catalyst regeneration, but permits a refiner to make more product from a given amount of catalyst.

All of these factors have combined to require faster turnover of catalyst within a reaction zone. Catalyst residence time before regeneration in a conventional, fixed-bed unit, is six months to several years. In the first moving bed reforming unit designs, catalyst residence time was about one month. The increasing demands by refiners for higher severity operation have necessitated even more frequent regeneration, approaching complete regeneration of the entire catalyst inventory of a moving bed reforming reactor in about one week.

The combination of higher space velocities, and higher catalyst circulation rates within the moving bed reactors, have lead to concern that the existing reactor configuration may not be adequate to handle high catalyst flow rates. The reactor configuration of conventional stacked reactors, such as shown in U.S. Pat. No. 3,647,680 also is very complex, and requires the careful assembly of a multitude of parts to insure proper circulation of catalyst from one bed to another. Of particular concern is the fear that with higher LHSV's, the naphtha and hydrogen flowing laterally through the catalyst may cause some of the catalyst to be pressed against the centerpipe of the radial flow reactor with such force that it will not be able to flow downward smoothly. The problem should be most acute wherein the catalyst must move sideways to enter one of the multiple catalyst transfer points.

An improved reactor design for a fixed bed, multiple stage hydrocarbon conversion process using an annular bed of catalyst was disclosed in U.S. Pat. No. 3,751,232 (Class 23/288R), the teachings of which are incorporated by reference. In this patent, multiple reaction zones are obtained in a single reactor vessel with a single annular bed of catalyst. However, there is no provision for withdrawing reactants from an intermediate point in the reactor, there is only one outlet to the entire reactor. Multiple inlet points are provided, not for reactants but for a heat transfer medium. The patentee was trying to solve a problem of pressure drop through the beds of catalyst, and the addition of a heat exchange medium under high pressure, via eductors, located between reaction zones was contemplated to minimize pressure drop through the reactor. When more than two reaction zones were contemplated, the patentee taught that it was necessary to pierce the annular bed of catalyst with a pipe containing heat exchange medium. Placement of a large pipe laterally through a radial bed of catalyst would not hurt fluid flow in a fixed bed reactor, but in a moving bed reactor would cause poor flow of catalyst above the pipe, and form a void space below the pipe which would permit bypassing of reactants.

One modification of the moving bed reactor scheme was disclosed in U.S. Pat. No. 3,864,240 (Class 208-64), the teachings of which are incorporated by reference. In this patent, only the terminal reactor was a moving bed reactor, while upstream reactors were of conventional, fixed bed design, without the provision for catalyst circulation. One advantage of such a reaction system is to minimize the problems associated with circulating catalyst from one reaction zone to the next by gravity flow. Unfortunately, the flow scheme described in this patent does not provide for the continuous regeneration of the upstream reactors, so it is not a total solution to the problem.

OBJECTS AND EMBODIMENTS

An object of the present invention is to provide an improved fluid-solid contacting process and apparatus.

Another object is to provide an improved moving bed hydrocarbon conversion reactor and process of simplified design, with multiple reaction zones, using a single annular bed of catalyst.

Another object is to provide a moving bed reactor, with multiple reaction zones, which does not hinder flow of catalyst from one reaction zone to the next.

Accordingly, the present invention provides an apparatus for permitting fluid contact with a single vertical moving bed of catalyst particles in a plurality of reaction zones which are vertically spaced from each other along the vertical length of the moving bed; said apparatus comprising a vertically elongated pressure tight vessel; a pair of vertical, concentric, inner and outer perforated screens positioned intermediate the axis of said vessel and the outer wall thereof and defining an annular conduit which is adapted to be filled with catalyst particles defining a catalyst bed, said conduit including a plurality of apertures at its upper and lower ends for permitting fresh catalyst to be added to the top of said catalyst bed and spent catalyst to be removed from the bottom, said apertures being connected to tubes which pass through the top and bottom of said vessel; a plurality of vertical, tubular inner and outer baffle members arranged in opposed relation at spaced locations along the length of said conduit for preventing the radial flow of fluid through said catalyst bed; a plurality of inner and outer horizontal baffle members affixed to at least some of said vertical baffle members for limiting the extent of axial flow of fluid through inner flow chambers defined by the hollow cylindrical space within said inner perforated screen and outer flow chambers defined by the hollow annular space between said outer perforated screen and the outer wall of the vessel, said horizontal baffles and said vertical baffles cooperating with each other and with the wall of the vessel to divide said vessel into a plurality of separate zones; fluid inlet and outlet means for each of said zones passing through the walls of said vessel, the inlet means for each of said zones being connected to one of the inner and outer flow chambers for the zone and the outlet means for each of said zones being connected to another of the inner and outer flow chambers for the zone, whereby at least the major portion of fluid passing through the zone will be forced to travel radially through the catalyst bed.

In another embodiment, the present invention provides an apparatus adapted to contain a vertical annular moving bed of catalyst and multiple reaction zones comprising: (a) a vertically elongated pressure-tight vessel; (b) a vertical annular catalyst bed within said vessel and defined by a cylindrical inner perforated screen and an outer perforated screen, said screens also defining inner distributors and outer distributors; (c) a catalyst inlet means connective with the top of the catalyst bed; (d) a catalyst outlet means connective with the bottom of the catalyst bed; (e) an upper reaction zone defined at the lower limit thereof by horizontal baffles across the inner and outer distributors, and by vertical baffles on the inner and outer screens; (f) fluid transfer means connective with the distributors within the first reaction zone; (g) at least one intermediate reaction zone defined by horizontal baffles across the top and bottom of the inner distributor of the reaction zone, horizontal baffles at the top, bottom and middle of the outer distributor of the reaction zone, and vertical screen baffles at the top, bottom and middle of the reaction zone, with fluid transfer means connective with the outer distributor above and below the horizontal baffle in the middle of the outer distributor; (h) a lower reaction zone defined at the upper limit thereof by horizontal baffles across the inner and outer distributors and vertical screen baffles; and, (i) fluid transfer means connective with the distributors within the last reaction zone.

In yet another embodiment, the present invention provides a process for hydrocarbon conversion of a hydrocarbon comprising contacting said hydrocarbon at hydrocarbon conversion conditions with a single vertical moving bed of catalyst particles disposed as a plurality of reaction zones which are vertically spaced along the vertical length of the moving bed; said zones contained in an apparatus comprising a vertically elongated pressure tight vessel; a pair of vertical, concentric, inner and outer perforated screens positioned intermediate the axis of said vessel and the outer wall thereof and defining an annular conduit filled with catalyst, said conduit including a plurality of apertures at its upper and lower ends through which apertures active catalyst is added to the top of said catalyst bed and spent catalyst is removed from its bottom, said apertures being connected to tubes which pass through the top and bottom of said vessel, a plurality of vertical, tubular inner and outer baffle members arranged in opposed relation at spaced locations along the length of said conduit for preventing the radial flow of hydrocarbon through said catalyst bed; a plurality of inner and outer horizontal baffle members affixed to at least some of said vertical baffle members for limiting the extent of axial flow of fluid through inner flow chambers defined by the hollow cylindrical space within said inner perforated screen and outer flow chambers defined by the hollow annular space between said outer perforated screen and the outer wall of the vessel, said horizontal baffles and said vertical baffles cooperating with each other and with the wall of the vessel to divide said vessel into a plurality of separate zones; fluid inlet and outlet means for each of said zones passing through the walls of said vessel, the inlet means for each of said zones being connected to one of the inner and outer flow chambers for the zone and the outlet means for each of said zones being connected to one of the inner and outer flow chambers for the zone, whereby at least the major portion of fluid passing through each zone will be forced to travel radially through the catalyst bed.

In yet another embodiment, the present invention provides a process for altering the loading exerted by a vertical moving annular bed of particles in a fluid stream which comprises: (a) containing in a pressure tight vessel a moving bed of particles in an annular bed between an inner perforate screen and an outer perforate stream; (b) providing two contiguous outer annular distributors defined by the outer perforate screen, an inner wall of the pressure tight vessel, and a horizontal, imperforate baffle intermediate the distributors; (c) providing an inner distributor defined by the inner perforate screen; (d) providing a vertical imperforate baffle, with a vertical height less than three times the radial thickness of the particle bed, on the inner and outer perforate screens at the same level as the horizontal, imperforate baffle; and, (e) maintaining different fluid pressures in the outer distributors, thereby causing fluid to flow radially in from one outer distributor through the particle bed to the inner distributor, and then to flow radially out to the other outer distributor and also causing verticle flow of fluid through the bed of particulates whereby the vertical passage of fluid through the bed alters the loading exerted by the bed.

SUMMARY OF THE INVENTION

As hereinbefore stated, the present invention is applicable to moving bed fluid-solid contacting and more specifically to a multitude of moving bed hydrocarbon conversion processes, and especially those which are effected in vapor phase. Illustrative of a hydrorefining process, is U.S. Pat. No. 3,696,022 (Class 208-67), the teachings of which are incorporated by reference. The operating conditions required in a reforming embodiment are disclosed in the patents previously discussed and need not be mentioned in great detail. Briefly, catalytic reforming is an endothermic process effected in a plurality of reaction zones, having interstage heating facilities therebetween. Typical reforming catalysts are spheres of one to three mm diameter. An advantage of the present invention is that catalyst transfer between reaction zones is much simplified, and it is possible to obtain good gravity flow of catalyst from one reaction zone to another even when the catalyst is not spherical but is instead extruded or pilled. The catalyst typically consists of a Group VIII noble metal, a halogen component and a porous carrier material, generally alumina. One or more catalyst modifiers such as rhenium, cadmium, germanium, tin, lead, titanium, vanadium, or sulfur, etc., may be used. The operation usually occurs in vapor phase at temperatures of 250° to 600° C. The hydrogen to hydrocarbon ratio may range from 0.1:1 to 20:1. The liquid hourly space velocity may range from 0.2 to 20. It is anticipated that the moving bed reaction system of the present invention will be used at more severe conditions than conventional fixed bed reactors, but it is of course also possible to operate the system of the present invention at milder conventional conditions.

Using the apparatus and process of the present invention, it is possible to have two or many reaction zones with a single catalyst bed. As applied to catalytic reforming, the use of three or four zones appears to give optimum results. Typical distribution of catalyst between reaction zones would be ten to 30 percent of the catalyst in a first zone, 20 to 40 percent in a second zone, and 40 to 60 percent in a third zone. The precise distribution of catalyst between zones depend on the nature of the charge stock, product desired, and processing conditions. In general, for charge stocks containing very high naphtha content, more of the catalyst should be shifted to the latter zones.

The present invention can be best understood by comparing it to and differentiating it from a conventional stacked reactor moving bed system. In a conventional stacked reactor design, the gas flow is identical to the gas flow experienced in a conventional side-by-side fixed bed reformer operating with radial flow. Gas enters the top of the reactor chamber, flows to an outer, annular chamber encompassing the catalyst bed, and flows radially in through the catalyst bed, is collected in a centerpipe and withdrawn from the reaction vessel via the centerpipe. This gas flow is repeated throughout each reaction zone. Catalyst enters each reaction zone via multiple, spaced apart catalyst addition points, and is withdrawn in the same fashion. Regardless of the number of catalyst addition and withdrawal points, there must always be some lateral flow of catalyst before it can enter a catalyst withdrawal pipe. There is always the possibility of catalyst "bridging" or failing to flow properly. Catalyst must pass through lengths of pipe from the bottom of a bed to the top of reactor bed in the next section. The catalyst then must flow laterally to fill the bed of catalyst and prevent void spaces. The opening through which catalyst must pass is so small that it may be compared to the opening in an hour glass. Thus, in the conventional stacked reactor design, gas flow is conventional, with radically different catalyst flow.

In contrast, in the reactor design of the present invention, the catalyst is free to move, without obstruction, from the top of the reactor chamber to the bottom. There still must be catalyst addition at the top of the reactor, and catalyst withdrawal at the very bottom of the reactor, but eliminated are the multiple catalyst injection and withdrawal points required between zones in the prior art design. It is possible to obtain several reaction zones with a unitary catalyst bed by baffling the outer annular vapor space to broadly define each reaction zone. These baffles will prevent gas from merely bypassing the reaction zone in downward flow. The gas is forced to pass through laterally across the catalyst bed rather than vertically down through the catalyst, because there is less pressure drop for the gas to flow laterally through the relatively thin bed of catalyst encountered in that direction, rather than horizontally downward. Once gas enters the centerpipe, it is blocked from further passage down through the centerpipe by baffles located in the centerpipe, so the gas takes the path of least resistance, in this case, it flows laterally out through the catalyst bed.

Thus, fluid can be added to and removed from an intermediate zone of the reactor vessel by piercing the outer wall of the vessel to admit gas into the outer radial area encompassing the catalyst bed, and by providing a complementary withdrawal point, and an intermediate baffle between the fluid inlet and outlet, which will withdraw gas from the annular space around that reaction zone. In the top and bottom reaction zones, it is possible to use one-half of the conventional gas circulation scheme. As applied to the top portion of the reactor, this means gas may enter the centerpipe of the top reactor and flow radially in to out and be withdrawn from the outer annular space. Similarly, for the last reaction zone, it would be possible to charge reactants to the outer annular space encompassing the lowermost bed of catalyst, and withdraw catalyst from the centerpipe of the last reaction zone. Accordingly, catalyst flows simply in the present invention, while the gas flow path is complex.

It is not necessary to operate in this semi-conventional fashion on either the first or last reaction zone, but is preferred to do so as getting gas in and out of the reaction zones is simplified. Operation with gas flowing as it does in an intermediate zone, i.e., radial in, followed by radial out, is also acceptable.

It is preferred that the points of gas entry and discharge be multiple points rather than single points. Especially preferred are multiple injection and withdrawal points with symmetrical piping to promote uniform gas flow through all parts of the catalyst. In general, the thicker the catalyst bed, and the higher the pressure drop across the catalyst bed, the less critical will be multiple, symmetrically spaced injection points. High pressure drop may be caused by a thick bed of catalyst, or by partially plugged screens. Screens with the percent open area varying with vertical spacing may also be used. Because of the multiple reaction zones contemplated for use in the present invention, and because of the excellent mixing of fluid streams which occurs through each stage of interheating, any maldistribution of fluid flow through the catalyst does not have a catastrophic effect, but merely slightly reduces the efficiency of catalyst contact or reheating of reactants.

Catalyst flow must be downward, by gravity. It is preferred, though not essential, that the reaction zones progress serially down through the reaction vessel, with the first reaction zone being uppermost and the last reaction zone being at the bottom. Such a gas flow is preferred because it turns one of the "defects" of this design into a virtue. The defect is gas bypassing from one reaction zone to the next zone via vertical downflow of gas through the reaction bed. Any such bypassing which occurs will actually promote flow of catalyst down the bed. This is in contrast to the conventional stacked reactor design wherein flow of gas downward through the catalyst transfer pipes is so minuscule as to be of little benefit in moving catalyst.

Depending upon the amount of catalyst boosting desired, and depending upon the amount of bypassing of the catalyst bed which can be tolerated, the thickness of the baffles between catalyst beds can vary from merely a point thickness to a thickness equivalent to three or four times the thickness of the annular bed. There will be maximum by-passing of gas around a reaction zone, and maximum boosting or thrusting action on the catalyst, when baffles in the annular space or in the centerpipe are very thin. When the baffles are twice as thick as the catalyst bed, gas flow will be roughly proportional to cross-sectional surface area available for flow. Gas will have to travel just as far to pass radial in and radial out, i.e., two times across the bed, as it will have to travel in bypassing the reactor by passing down through the bed of catalyst from one zone to the next. Since the gas path is about the same distance in each instance, i.e., the length of the path which each molecule of gas must travel, is two times the thickness of the catalyst bed, the gas flow will be proportional to surface area. Thus, for a reactor with a center pipe radius of one meter, and the radius of a circle enclosing the outermost limits of the catalyst bed being two meters, the cross-sectional area of the catalyst bed is about 9.4 $m^2$. For an intermediate reaction zone, seven meters high, with vertical screen baffles two m high, the average area exposed to radial flow is about 66.0 $m^2$ so one-eighth of the gas would bypass, i.e., not pass in radial flow, but pass via downflow, while seven-eighths of the gas would pass in radial flow. Increasing the length of the impervious screen baffles from 2X to 3X the bed thickness will reduce by two-thirds the one-eighth bypassing to one-twelfth bypassing. Even here the amount of bypassing is not critical, in that the reactants still contact the catalyst. In a sense the only bypassing that occurs is bypassing of the interheaters, so that the reactants must be heated to a slightly higher temperature so that the desired temperature will be achieved in the reactor when gas that has passed through the interheater contacts and is mixed with gas that has bypassed the interheater in the next reaction stage. As the total temperature drop typically encountered in a multibed reforming reactor is only about 120° C and because eleven-twelfths of the fluid would pass through the interheaters, the increase in interheater duty is one-twelfth of 120° C, or 10° C., which translates into an average increase in the outlet temperature of each heater of about 3° C., for a three zone system, which is a tolerable price to pay for the other benefits obtained through the practice of the present invention. Another interesting feature of the present invention is that there is no stagnant catalyst between beds. All prior art reactors known, both fixed bed and moving bed, must allow for some space at the top and bottom of a reaction zone for catalyst distribution and withdrawal. This reactor suffers the same infirmities as prior art reactors, but only at the top and very bottom of the annular bed of catalyst. Catalyst between zones still contacts reactants, via bypassing. There is no wasted or stagnant catalyst between reactors 1 and reactor 2, and between reactor 2 and reactor 3. All of the catalyst may be used all of the time if a lot of bypassing can be tolerated. This is in contrast to conventional designs wherein 2 to 5% of the catalyst volume is in areas where it never is in the main stream of reactant flow.

Another advantage of the reactor design of the present invention is that it permits shifting of relative catalyst distributions in the reaction zones without great difficulty. Thus, if the source of feedstock for a reformer changes, e.g., from an Arabian to a Venezuelan derived naphtha, and there is a significant change in the naphthene content of feed, optimum reactor design calls for a shift in catalyst distribution. Thus, in a three zone reformer, a refiner may find it desirable to go from a 20-30-50 catalyst distribution through his three reforming zones to a more skewed distribution, e.g., 10-40-50. Such a change would be impossible in conventional fixed bed, side-by-side reforming reactors because an existing reactor cannot be expanded to contain more catalyst, at least not expanded enough to accommodate a 33% increase in catalyst loading such as would be experienced by the second reactor. It would also be very difficult to change catalyst distribution in a conventional stacked reactor system, because of the size and complexity of the stacked reactors, and because very large diameter pipes pass through the reaction vessel and under a reaction zone to remove fluids from the centerpipe of intermediate reaction zones. Such modification is extremely difficult. In contrast, in the reactor design of the present invention it would be possible to shift the catalyst loading by raising or lowering the screen baffles and horizontal baffles in the distributors. Since, in some embodiments, the screens containing the annular bed of catalyst are perfectly cylindrical throughout the entire length of the reactor, there would be no insurmountable problem encountered in merely raising or lowering the baffles. Of course, it may be necessary to provide multiple, vertically spaced, fastening means for attaching horizontal and vertical baffles to screens and in distributors if such operating flexibility is desired. It will also be necessary to provide at least enough space in the centerpipe and in the outer distributor so that a workman can enter the space and shift the location of the screens, and re-seal the baffles to the reactor walls with asbestos rope or other sealing material. Alternatively, it should be possible, though much more expensive, to provide for floating internals which could be raised or lowered by operation of a cable. Floating internals, i.e., vertically movable during operations, would require much closer fit between the screens and the vessel walls to provide adequate sealing, so such flexible operation is not believed necessary for most units.

BRIEF DESCRIPTION OF THE DRAWING

The drawing is a simplified flow diagram, not to scale, illustrating an apparatus and process especially useful to moving bed reforming.

DETAILED DESCRIPTION

Reactor 1 consists of a containment vessel 3 having reactant inlet 2. In the reforming embodiment, hot hydrogen and fresh feed, a naphtha, enter via inlet 2 fluid distributing space 4 defined by the inner walls of catalyst containment screen 5. Reactants pass through screen 5 into the catalyst maintained as a moving bed 6, and through outer screen 7 to enter outer annular space 8. Gas flow downward through the reactor is blocked in inner distributing space 4 by partition 10, and in outer annular space 8 by partition 9. Over 90% of the gas entering via inlet 2 is removed via outlet 11 and charged to a heater 60.

The uppermost section of reactor 1 is designated zone 1. Zone 1 is equivalent to the first reactor in a conventional reformer. The top of zone number 1 is defined by the lower edge of impervious baffle 12. The lower boundary of zone 1 is defined by the lower edge of baffle 13. The entire amount of catalyst in zone 1 is active because it sees reactants all of the time. There is some bypassing of reactants from zone 1 to zone 2, via the catalyst bed rather than via interheater 60, but gas bypassing the heater does not bypass the catalyst. To promote maximum heater efficiency, the reactor should be designed to preferably limit bypassing to no more than 10%.

Reheated reactants leave heater 60 and enter zone 2 via line 14. Hot gases enter annular distributing space 15 and pass through screen 7 into catalyst bed 6. After this radial flow, out to in, of gases, they are collected in centerpipe 17 and immediately pass down and out to return to catalyst bed 6, in radial flow, in to out, to finally pass into annular gas collector 18. Gas is removed from zone 2 via line 18 and charged to heater 61. Gas flow is maintained radially out to in, in the upper part of zone 2 and radially in to out in the lower part of zone 2 by the strategic placing of imperforate baffles. The first baffles encountered by entering gas are baffles 16 and 9 in outer annular space 15. The path of least resistance for the gas is through catalyst bed 6 into centerpipe 17. Once the gas enters centerpipe 17 it encounters another obstacle, baffles 17 and 20 in the upper and lower portions of the centerpipe. The path of least resistance for the gas is again through catalyst bed 6 into annular space 18. Reactants are removed from zone 2 via line 19. Baffles 30 and 31, in about the middle of zone 2's catalyst bed, minimize short circuiting of gas from annular space 15 to annular space 18. If these baffles were merely a few centimeters thick, it would be much easier for gas to pass through the few centimeters of catalyst around the edge of the baffles, as opposed to passing through the bed of catalyst in radial flow. The baffles 30 and 31 may be slightly smaller than the baffles defining the upper or lower bounds of a reaction zone. This is because adequate reaction of reactants will occur as long as the reactants see catalyst, whereas re-heating of the reactants will not occur if the reactants do not go through an interheater. Hence in this embodiment, wherein reheating was not needed, it was possible to minimize the size of baffles 30 and 31. As an added benefit of this design, the shortened baffle sections 30 and 31 also promote donward movement of catalyst in bed 5. Thus in the reactor design of the present invention high reactant flow rates actually promote movement of the catalyst bed. Baffles 22 are longer than baffles 30 & 31.

Reactants are heated in heater 61 and re-enter reactor 1 via line 23 to enter zone 3. Hot gases are distributed in outer annular space 24 and then flow radially out to in through catalyst bed 6 into centerpipe 25. Gases are removed from centerpipe 25 via outlet 28. Baffles 21 and 27 define the upper and lower limits of annular space 24. Baffle 20 and outlet 28 define the limits of centerpipe 25.

Catalyst enters vessel 1 via catalyst inlets 50 shown at the top of the reactor. Multiple catalyst inlets 50 may be used and these multiple inlets may provide a reduction zone if needed for catalyst pre-treatment. Alternatively, a reduction zone may be provided within reactor vessel 1. The top of the catalyst bed 6 is sealed off from the reactor with upper cap 51. Upper cap 51 and baffle 12 define a stagnant zone through which little or no reactant flow occurs. This permits catalyst to enter the reactor and be distributed uniformly without immediately being subjected to contact with reactants. An analogous stagnant zone is provided at the lower end of catalyst bed 6 by lower cap 52 and baffle 26. Catalyst is withdrawn from vessel 1 via multiple catalyst withdrawal lines 53.

In the embodiment shown in the drawing, reactant flow was generally down through the bed. This design was preferred because the spherical reforming catalyst contemplated for use in this invention is free flowing and very strong. In some instances, depending upon the height of the reactor and its width, and upon the strength and flowing characteristics of the catalyst, it may be desirable to modify this scheme. Some catalysts tend to pack or bridge when subjected to pressure. The reason for this is not completely understood at this time, but it is believed to be a phenomenon similar to that experienced when working with some sands when wet. When compressed, the sand will be a firm, rigid mass, yet when pressure is released, the sand reverts to a fluid state. Thus, for some applications it may be desirable to minimize the downward force of the catalyst, either because of flow or crushing considerations, by completely reversing the flow indicated. Alternatively, it may be desirable to reverse the flow of one or more but less than all of the zones within a reactor.

Similarly, it may be desirable to provide for multiple reactant inlet and outlet points, with symmetrical piping. This would promote uniform flow of gas. In the embodiment shown, this was not provided because the annular spaces provided were large enough, and the pressure drop across the bed enough to promote uniform flow of gases entering each reaction zone.

Baffles may be provided on the inlet and outlet lines to at least split the flow into a clockwise and a counter-clockwise component to minimize problems of poor reactant flow in any one part of the bed. It is also believed slightly beneficial to provide offset inlets and outlets within a reaction zone, as indicated in reaction zone 2. Offsetting the inlets and outlets will tend to promote good fluid flow. Further, overworking of catalyst on one side of the bed will be offset by overworking of catalyst on the opposite side, annularly speaking, of the catalyst bed, and catalyst which leaves the reactor should contain a relatively uniform coke level. Thus, the reactor design of the present invention is very forgiving of mistakes made in providing for good fluid flow through the catalyst bed.

As applied to a reforming embodiment, the reactor configuration for a unit processing 35000 BPSD (231.7 m$^3$/hr) of a naphtha charge stock is as follows. For a liquid hourly space velocity of 2.0, about 116 cubic meters of catalyst is required in the active zone. Of course a certain addition inventory of catalyst is required in the bottom of the catalyst bed and at the very top to provide for sealing of the catalyst bed and filling of the stagnant areas therein. This amount of catalyst is only about 1 to 3 percent of the catalyst inventory. Of course a certain amount of catalyst inventory is required to be in a continuous regenerator, if one is used, or available for use as spent catalyst is accumulated for periodic regenerations if a batch regenerator. The reactor is designed to operate with a hydrogen to hydrocarbon mole ratio of 4, an inlet pressure to the first reaction zone of 12.5 atmospheres, absolute, and an outlet pressure from the last reactor of 11 atmospheres. This is a very low pressure drop, and is indicative of the use of low pressure drop heaters, and careful design of piping to minimize pressure drop. The relatively thin annular bed of catalyst, compared to prior art radial flow designs and especially compared to conventional fixed bed, down flow reactors, has a very low pressure drop, but the tortuous path followed by the gas decreases somewhat the otherwise low pressure drop experienced in passing through a moving bed reactor of the present invention. The centerpipe diameter should be 1.2 meters, and the diameter of the outer screen should be 2.4 meters. Thus, the catalyst bed is maintained as an annular bed with an inner diameter of 1.2 m and an outer diameter of 2.4 m. The reactor containment vessel's inner diameter is 3.5 m. The low pressure drop experienced through this catalyst bed was not believed sufficient to provide optimum gas distribution, so internal piping was provided in the second reaction zone to split the incoming gas flow into two streams, and the discharge points of these streams were placed 180° apart from one another. Each of these discharge points in turn split the flow into two directions, so that gas entering and leaving the second reactor section did so via four symmetrically spaced openings on both the inlet and outlet to zone 2.

To provide maximum heater efficiency, the screen separating zone 1 from zone 2 was baffled over two meters of its length, or a little more than three times the thickness of the catalyst bed. This will insure that over 90% of the gas leaving zone 1 will do so via the interheater. The screen baffle defining the upper and lower portions within zone 2 was only 1.2 meters thick, or twice the thickness of the catalyst bed. This meant that gas would have about as easy a path to take in flowing laterally across the catalyst bed as down through the catalyst bed in the section around this baffle point. This is not harmful, as it does not matter if the reactants contact catalyst in radial or downflow, as long as contact occurs. The baffle separating zone 2 from zone 3 was two meters thick, again to insure that more than 90% of reactants leaving zone 2 will do so only via the interheater.

The height of catalysts in the very top of the reactor, immediately under the catalyst addition lines, will be 0.5 meters. This height must of course be coordinated with the number of catalyst addition points, in this case, 16 symmetrically spaced pipes of 5 cm internal diameter.

The height of the zone 1 is 8 m, zone 2 is 10 m, and zone 3 is a 18.5 m. The total volume of catalyst will be 127 m$^3$, which slightly exceeds the 116 m$^3$ required for a 2.0 LHSV. The difference is to allow for sealing of the top and bottom of the bed, and compensation for catalyst being less exposed to reactants as it passes between the beds and for future expansion.

In the reforming embodiment, it is contemplated that the screens used to contain the annular bed of catalyst will be free of obstructions and promote smooth flow of catalyst. Screens which are especially well suited for this use are the well known Johnson well screens, originally developed for use in water walls. These screens have triangular bars welded onto a support means. The catalyst sees a smooth, finished, flat surface with a long spiral groove therein. Of course other types of screen, such as metal fabric, may also be used. The screen may also consist of relatively thin walled pipe with many small holes or slots drilled or punched therein. The baffles may be metal plates welded or bolted onto the screens. If pipe with slots cut into it is used, the slots may be welded shut or simply omitted.

In the embodiment shown, the annular bed of catalyst maintains a constant cross-sectional area from the very top of the bed to the bottom of the bed. This type of catalyst flow is preferred, because there is an absolute minimum amount of shifting of catalyst which leads to abrasion and wear thereof. An acceptable variation, however, is to increase the cross-sectional area of the catalyst bed as it moves down the reactor. The increase in cross-sectional area should preferably occur between zones to simplify calculation of flow through each zone. The transition from a thin to thicker bed may be made gradually or abruptly. Catalyst can easily flow into a larger space, but not so easily do the reverse. If the decision is made to increase the cross-sectional area of the catalyst bed in the lower sections of the reactor, the amount of extra baffling required on screening between reactor sections can easily be determined on the basis of the pouring characteristics of the catalyst being considered. In the embodiment shown, if the third reactor section were to be thicker than the preceding reactor sections, this could be accomplished by keeping the centerpipe diameter constant and providing an outer screen of increased diameter. Increasing the outer screen diameter may be done by using a larger radius screen or by providing multiple "scallops" ringing the inside of the wall of reactor 1 as substitute for the outer screen. Thus, 50 or 60 semicircular vertical sections, similar to a pipe split in half, placed about the inside of the outer wall of reactor vessel 1, could define the outer limits of the catalyst bed 6 in the third reaction section. Of course, if the cross-sectional area of the catalyst bed increased than the number of catalyst withdrawal points 53 should also be increased to provide for uniform withdrawal of catalyst from the bottom of the reactor bed.

The net effect of the present invention is to provide for a reactor and process wherein a moving bed of solids is given an easy and straight path, while fluids which must contact the solid are given a more difficult path to follow. Completely avoided is the necessity of emptying the entire catalyst bed through a few narrow pipes and redistributing it to each lower catalyst bed. The "hour glass" passage of catalyst between beds, is eliminated. Simple gravity determines the flow of the catalyst, while fluid dynamics determines flow of fluid, resulting in much simplified piping for catalyst flow. Other benefits include greater utilization of catalyst and a more compact reactor design. Refiners also have a way to promote, or hinder, downflow of catalyst through a bed because of the unique flow characteristics of the present reactor design and process, which combines features of both radial flow and up or down flow over a fixed bed of catalyst.

I claim as my invention:

1. A process for hydrocarbon conversion of a hydrocarbon comprising contacting said hydrocarbons at hydrocarbon conversion conditions with a single vertical moving bed of catalyst particles disposed as a plurality of reaction zones which are vertically spaced along the vertical length of the moving bed; said zones contained in an apparatus comprising a vertically elongated pressure tight vessel; a pair of vertical, concentric, inner and outer perforated screens positioned intermediate the axis of said vessel and the outer wall thereof and defining an annular conduit filled with catalyst, said conduit including a plurality of apertures at its upper and lower ends through which apertures active catlyst is added to the top of said catalyst bed and spent catalyst is removed from its bottom, said apertures being connected to tubes which pass through the top and bottom of said vessel, a plurality of vertical, tubular inner and outer baffle members arranged in opposed relation at spaced locations along the length of said conduit for preventing the radial flow of hydrocarbon through said catalyst bed; a plurality of inner and outer horizontal baffle members affixed to at least some of said vertical baffle members for limiting the extent of axial flow of fluid through inner flow chambers defined by the hollow cylindrical space within said inner perforated screen and outer flow chambers defined by the hollow annular space between said outer perforated screen and the outer wall of the vessel, said horizontal baffles and said vertical baffles cooperating with each other and with the wall of the vessel to divide said vessel into a plurality of separate zones; fluid inlet and outlet means for each of said zones passing through the walls of said vessel, the inlet means for each of said zones being connected to one of the inner and outer flow chambers for the zone and the outlet means for each of said zones being connected to one of the inner and outer flow chamber for the zone, whereby at least the major portion of fluid passing through each zone will be forced to travel radially through the catalyst bed.

2. Process of claim 1 wherein the fluid is a naphtha, reforming conditions and a reforming catalyst are used, and a reformate is recovered.

3. Process of claim 1 wherein the fluid is a paraffin, dehydrogenation conditions and a dehydrogenation catalyst are used and an olefin is recovered.

4. A process for the multiple reaction zone conversion of a hydrocarbon in a reactor vessel containing a single annular bed of catalyst comprising:
(a) heating the hydrocarbon in a first temperature adjustment means to hydrocarbon conversion temperature and charging the hydrocarbons into a first reaction zone by passing said hydrocarbons radially through said catalyst bed;
(b) removing hydrocarbons from the first reaction zone and charging it to an intermediate temperature adjustment means;
(c) removing hydrocarbon from the temperature adjustment means and charging it to an intermediate reaction zone by passing the hydrocarbon into a first outer annular distributor around one-half of the vertical length of the intermediate reaction zone, interposing vertically disposed blocking media between the first outer annular distributor and the below defined centerpipe and interposing a horizontal blocking media in said below defined outer annular distributor, passing hydrocarbon through the catalyst bed, in radial out to in flow, to a centerpipe defining the interior of the annular bed of catalyst within the intermediate reaction zone, and passing hydrocarbons from said centerpipe through said bed of catalyst, in radial in to out flow, to a second outer annular distributor around the other one-half of the vertical length of the reaction zone;
(d) withdrawing hydrocarbon from the intermediate reaction zone by withdrawing it from the second distributor and passing it to a final temperature adjustment means;
(e) removing hydrocarbon from the final temperature adjustment means and charging it to a final reaction zone by passing hydrocarbons in radial flow through the catalyst bed;
(f) withdrawing converted hydrocarbon from said reactor vessel; and,
(g) adding, at least periodically, active catalyst to the top of the annular bed of catalyst and at least periodically withdrawing spent catalyst from the bottom of the annular bed of catalyst.

5. Process of claim 4 wherein the annular bed of catalyst is defined by a perforate cylindrical screen which also defines the inner distributor, and a perforate outer screen which also defines the outer distributor.

6. Process of claim 4 wherein said blocking media are defined by horizontal baffles in the inner and outer distributors and vertical baffles on the inner and outer screens, whereby the major portion of flowing hydrocarbon is forced to flow radially through the catalyst bed in each reaction zone.

7. Process of claim 4 wherein the vertical baffles have a height greater than the radial depth of the catalyst bed.

8. Process of claim 7 wherein the intermediate reaction zone is divided into two substantial equal sections, one for radial in flow and the other for radial out flow, defined by vertical baffles on the inner and outer screens, at the top, middle and bottom and by horizontal baffles in the outer distributor at the top, middle and bottom of the reaction zone.

9. Process of claim 8 wherein the vertical baffles at the top and bottom of each intermediate reaction zone have a height greater than twice the radial thickness of the catalyst bed.

10. Process of claim 4 wherein the hydrocarbon is a petroleum naphtha, the process is catalytic reforming, and the temperature adjustment means are heaters.

11. Process of claim 4 wherein the hydrocarbon is a dehydrogenatable paraffin, the process is paraffin dehydrogenation, and the temperature adjustment means are heaters.

12. Process of claim 4 wherein the first reaction zone is uppermost, the intermediate reaction zone is in the middle, and the final reaction zone is at the bottom of the reactor.

13. Process of claim 8 wherein the intermediate reaction zone is divided into an upper and a lower section and gas flow through the upper section is radial in and gas flow through the lower section of radial out.

14. Process of claim 8 wherein the intermediate reaction zone is divided into an upper and a lower section and gas flow through the upper section is radial out and gas flow through the lower section is radial in.

15. A process for altering the loading exerted by a vertical moving annular bed of particles in a fluid stream which comprises:

(a) containing in a pressure tight vessel a moving bed of particles in an annular bed between an inner perforate screen and an outer perforate screen;

(b) providing two contiguous outer annular distributors defined by the outer perforate screen, an inner wall of the pressure tight vessel, and a horizontal, imperforate baffle, intermediate the distributors;

(c) providing an inner distributor defined by the inner perforate screen;

(d) providing a vertical imperforate baffle, with a vertical height less than three times the radial thickness of the particle bed, on the inner and outer perforate screens at the same level as the horizontal, imperforate baffle; and, e maintaining different fluid pressures in the outer distributors, thereby causing fluid to flow radially in from one outer distributor through the particle bed to the inner distributor, and then to flow radially out to the other outer distributor and also causing vertical flow of fluid through the bed of particulates whereby the vertical passage of fluid through the bed alters the loading exerted by the bed.

16. Process of claim 14 wherein the loading of the particulate bed is decreased by causing fluid pressure to be higher in the lower of the two outer annular distributors.

17. Process of claim 14 wherein the loading of the particulate bed is increased by causing fluid pressure to be higher in the upper of the two outer annular distributors.

* * * * *